United States Patent [19]

Beavon et al.

[11] 4,055,401
[45] Oct. 25, 1977

[54] REDUCING GAS GENERATOR

[75] Inventors: David K. Beavon, Pasadena; Earl J. Jirus, Arcadia, both of Calif.

[73] Assignee: The Ralph M. Parsons Company, Pasadena, Calif.

[21] Appl. No.: 540,869

[22] Filed: Jan. 14, 1975

[51] Int. Cl.² .............................................. F01N 3/14
[52] U.S. Cl. ................................. 23/277 C; 252/188; 423/210; 431/182
[58] Field of Search .......................... 23/277 C, 277 R; 110/8 A; 431/4, 182, 183, 184; 423/210

[56] References Cited

U.S. PATENT DOCUMENTS

| 2,904,417 | 9/1959 | Te Nuyl | 431/183 X |
| 2,975,594 | 3/1961 | Eastman | 431/4 X |
| 3,549,333 | 12/1970 | Tabak | 23/277 C |
| 3,671,172 | 6/1972 | Chedaille et al. | 431/182 X |
| 3,738,816 | 6/1973 | Hirt | 23/277 C |
| 3,744,250 | 7/1973 | Tanasawa et al. | 23/277 C X |
| 3,759,668 | 9/1973 | Yamada et al. | 23/277 C |
| 3,789,104 | 1/1974 | McCauley | 23/277 C X |
| 3,797,240 | 3/1974 | Inoue et al. | 23/277 C X |
| 3,805,523 | 4/1974 | Tanasawa | 23/277 C X |
| 3,837,303 | 9/1974 | Baardson | 110/8 A |
| 3,850,581 | 11/1974 | Hills et al. | 23/277 C |
| 3,922,137 | 11/1975 | Peczeli et al. | 431/183 |

Primary Examiner—Joseph Scovronek
Assistant Examiner—Arnold Turk
Attorney, Agent, or Firm—Christie, Parker & Hale

[57] ABSTRACT

Apparatus for heating and mixing industrial tail gases with a reducing gas by burning a mixture of fuel, air, and steam in a combustion chamber having a small outlet opening at the end of the chamber. A jacket surrounds the combustion chamber. The industrial gases are circulated around the combustion chamber inside the jacket, heat being transferred from the combustion chamber to the industrial gas. It is then mixed with the combustion products from the outlet of the combustion chamber to form a high temperature mixture of an industrial gas and a reducing gas for subsequent processing.

10 Claims, 5 Drawing Figures

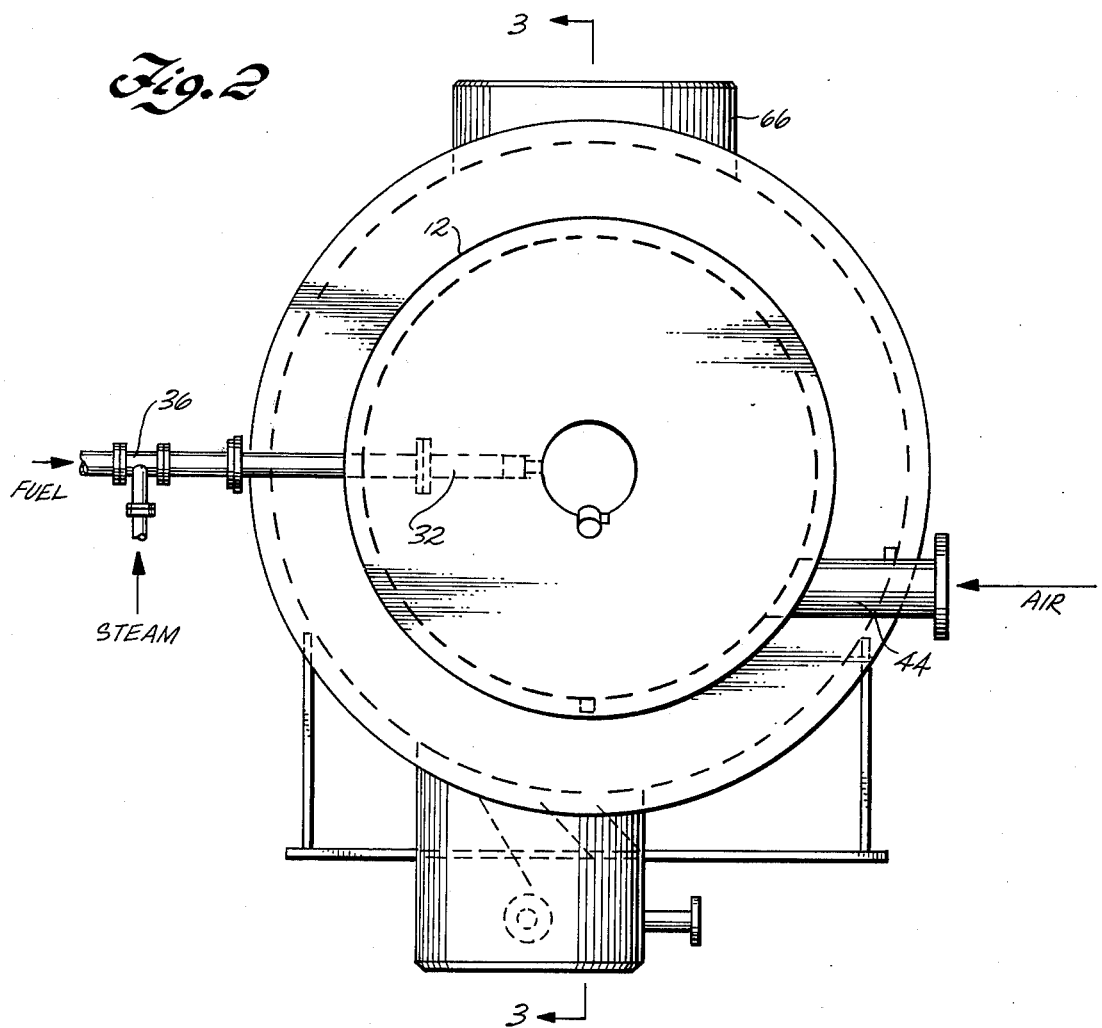
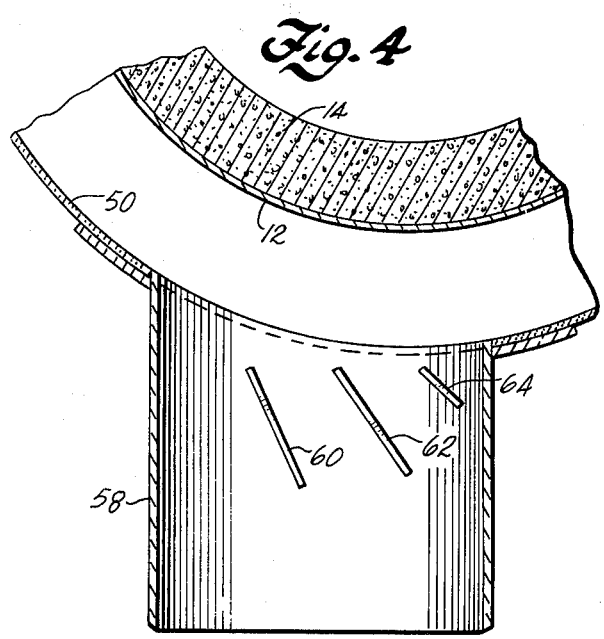
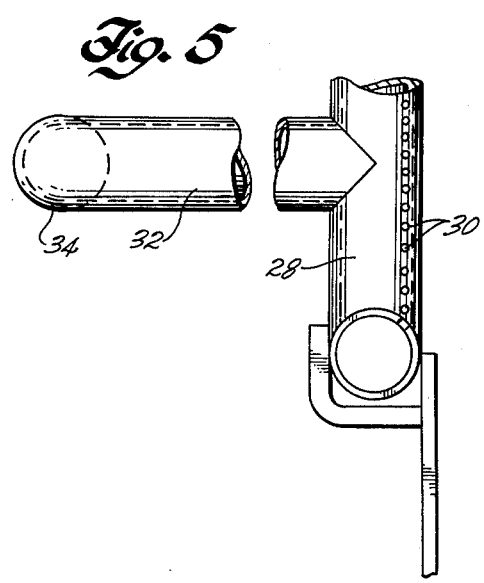

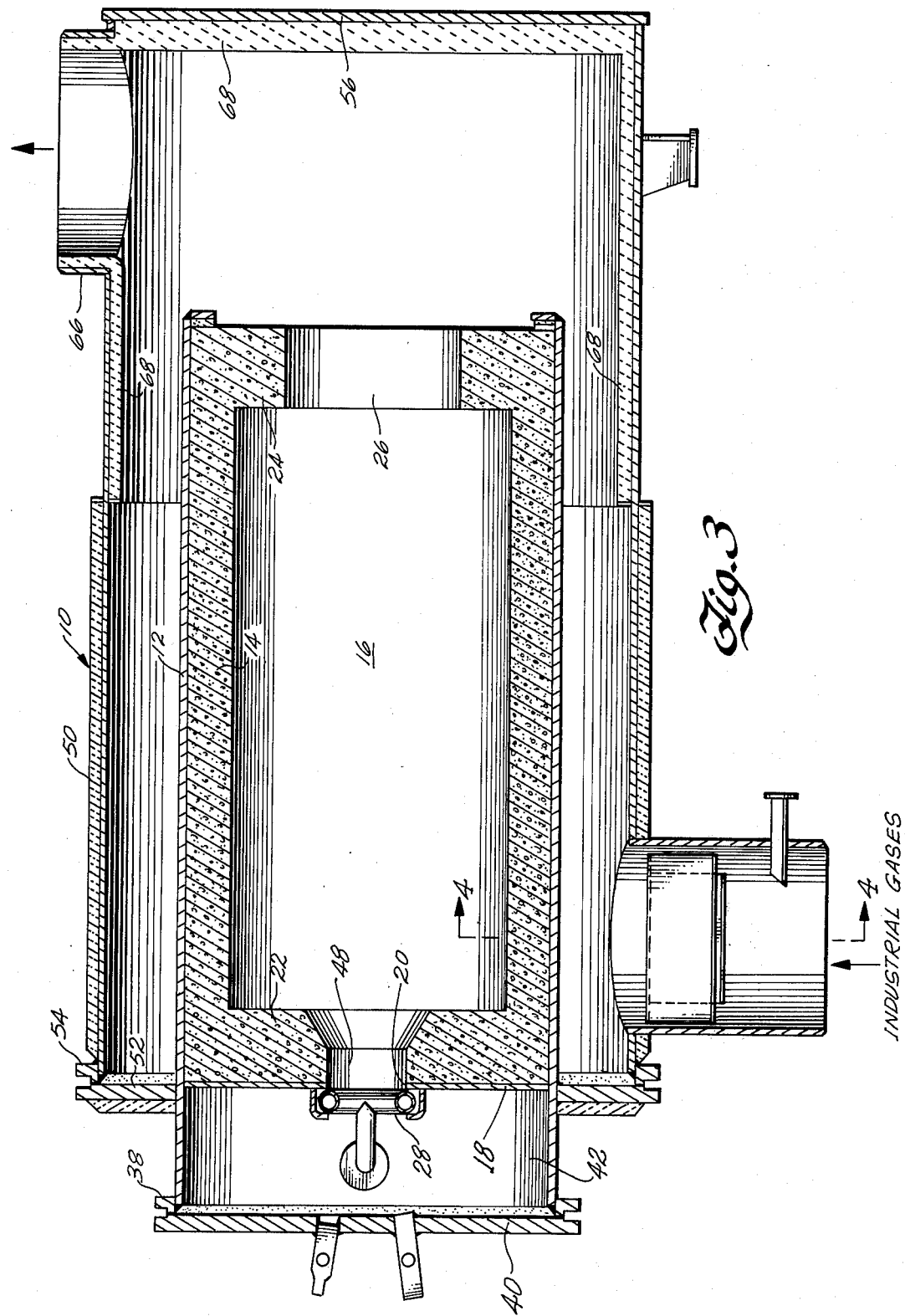

REDUCING GAS GENERATOR

FIELD OF THE INVENTION

This invention relates to a method and apparatus for processing industrial tail gases, and more particularly, is concerned with a heater assembly for generating a reducing gas by combustion of a fuel in an oxygen limited atmosphere, and mixing the reducing gas and industrial gas.

BACKGROUND OF THE INVENTION

In U.S. Pat. No. 3,752,877, for example, there is described a process for the reduction of compounds, such as sulfur, nitrogen oxides, and the like, occurring in industrial gases, such as the tail gases from Claus plant, or the like. In the patented process, the tail gases are first heated to an elevated temperature by a conventional burner through a heat exchanger that prevents mixing of the products of combustion with the tail gases. After heating, the tail gases are mixed with a reducing gas containing hydrogen and carbon monoxide. The reducing gas is produced by burning air and fuel in the presence of steam in a sub-stoichiometric combustion reaction. When hydrocarbon is burned stoichiometrically or sub-stoichiometrically, it is difficult to avoid formation of free carbon or soot, which is harmful to subsequent process steps. It is also difficult to insure complete consumption of free oxygen, which of course is not wanted in the reducing gas.

SUMMARY OF THE INVENTION

The present invention is directed to an improved method and apparatus for generating a reducing gas and at the same time using the heat generated by the production of the reducing gas to preheat the industrial gas, and then mixing the industrial gas with the reducing gas. In the past, high operating temperature in the reducing gas generator has presented cooling problems since operating temperatures generally exceed working temperatures of common metals. The present invention provides improved efficiency by utilizing the industrial gas as a cooling agent for the walls of the combustion chamber. In brief, the apparatus of the present invention includes a combustion chamber comprising a refractory lined elongated metal cylinder preferably having a length to a diameter ratio of 2 to 1 surrounded by a concentric outer cylinder forming an annulus through which the industrial gas flows.

The combustion chamber terminates in a radiant end wall having an exit orifice of an area up to about 50% of the end wall. Fuel gas preferably premixed with steam is directed into the combustion chamber through a burner ring with multiple outlet holes. Air or oxygen is admitted into the combustion zone through a wind box positioned rearward of the burning into which a source of oxygen, typically air is introduced tangentially to form a vortex flow within the combustion chamber. Relatively high rotary velocity is imparted by a constricted throat section at the entrance to the combustion chamber. Preferably, the constricted throat doubles the velocity of the gas in the wind box which is in the range of about 50 to 150 ft./sec. The products of combustion are mixed with the industrial gas after the products of combustion pass through a flame exit orifice.

BRIEF DESCRIPTION OF THE DRAWINGS

For a more complete understanding of the invention, reference should be made to the accompanying drawings, wherein:

FIG. 2 is an end view of the apparatus;

FIG. 3 is a sectional view taken substantially on the line 3—3 of FIG. 2;

FIG. 4 is a partial sectional view taken on the line 4—4 of FIG. 3; and

FIG. 5 is a fragmentary view showing the burner.

DETAILED DESCRIPTION

Figure 1:
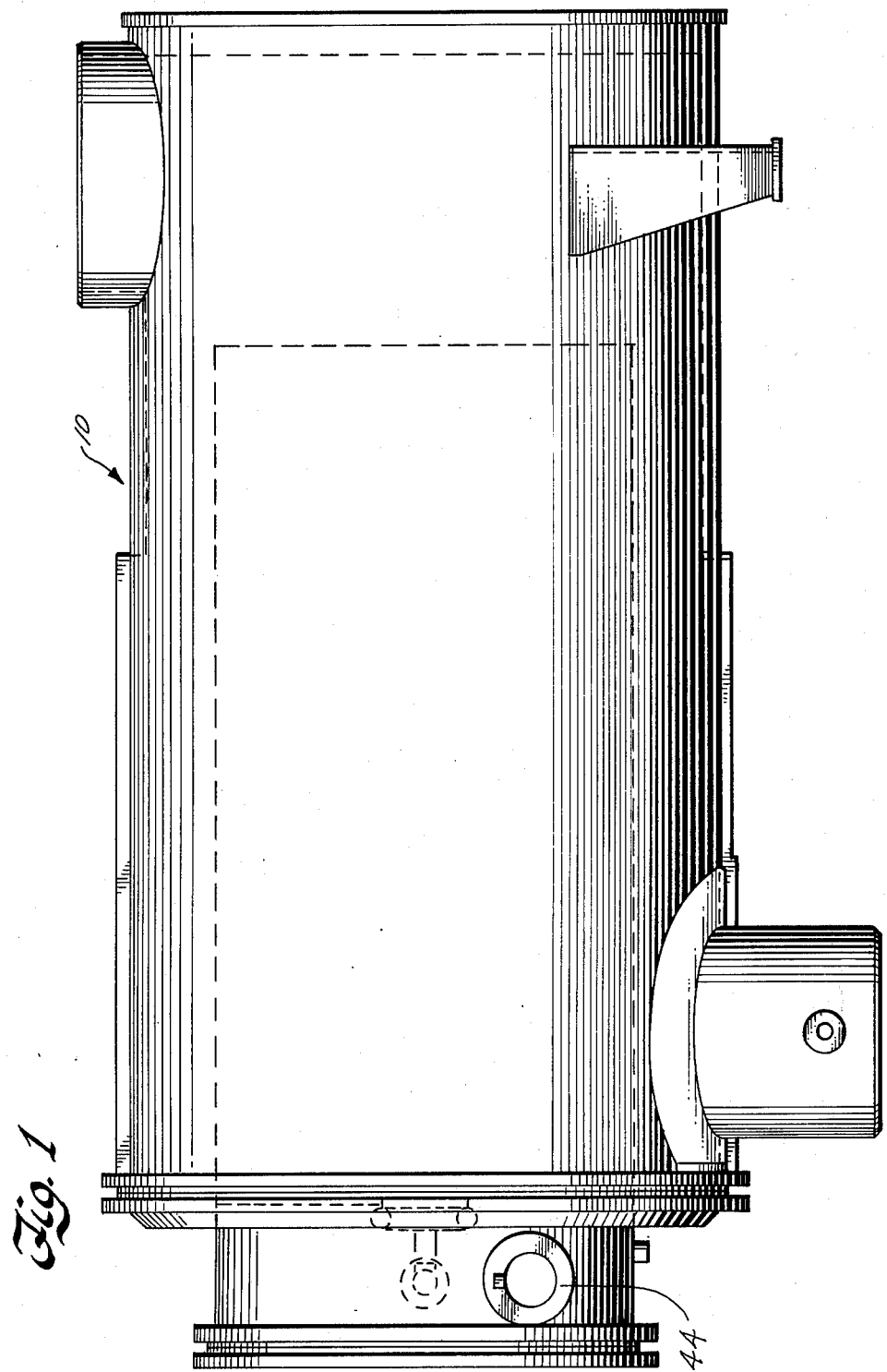
FIG. 1 is a side elevational view of the apparatus of the present invention.

Referring to the drawings in detail, the numeral 10 indicates generally the combustion and mixing apparatus which includes an inner metal cylinder 12 having an inner lining 14 of refractory material forming a combustion chamber 16. A metal inner wall 18 having an opening 20 is lined with refractory material 22 surrounding the opening 20 to form a restricted throat at the inlet end of the combustion chamber 16. The other end 24 of the combustion chamber is formed of refractory material having an outlet opening 26 therethrough forming a flame exit orifice.

An annular burner 28 surrounds the outside of the opening 20 in the metal wall 18. As shown in detail in FIG. 5, the burner ring is formed of a hollow pipe having a plurality of equally spaced holes 30 around the inner periphery thereof for directing fuel gas into the combustion chamber. An inlet pipe 32 is connected to the burner 28 and extends through a 90° elbow 34 outwardly through the metal cylinder 12. The pipe 32 connects through a T-connection 36 to a source of a gaseous or liquid fuel which is hydrocarbon, such as natural gas, methane or the like, a fuel gas containing hydrogen, carbon monoxide, or mixtures thereof, normally liquid hydrocarbons and the like. The T-connection 36 also connects to a source of steam, the T-connection mixing the steam and fuel together before the mixture is directed into the combustion chamber through the burner 28.

The inlet end of the metal cylinder 12 is provided with a flange 38 to which is bolted or otherwise secured an end plate 40. The space within the cylinder 12 between the end plate 40 and inner wall 18 provides a wind box 42. Air, oxygen, or other oxygen-containing gas is connected into the wind box through an inlet pipe 44. As best seen in FIG. 2, the inlet pipe 44 is positioned off center, so that the flow of air into the wind box is tangential to the cylindrical wall 12. Thus a rotary motion is imparted to the air within the wind box 42 by the flow of air out of the pipe 44.

The air from the wind box enters the combustion chamber through the opening 20 where it mixes with the fuel and steam from the burner ring 28. The mixture is ignited by suitable means, such as a pilot flame, an electrical spark or the like.

In order to produce high turbance in the throat zone indicated at 48, formed by the opening through the refractory material 22, air is introduced through the pipe at a velocity in the range of 50 to 150 ft. per second, thus maintaining a high rotary velocity in the wind box and a still higher velocity in the throat 48 preferably in the range of about 100 to about 300 ft. per second or double the velocity in the wind box. The constriction formed by the throat 48 is preferably less than half the diameter of the combustion chamber 16.

To provide cooling for the combustion chamber, and at the same time to provide preheating of the industrial or tail gases, the combustion chamber is provided with a cylindrical shell or jacket 50. The jacket 50 is supported from an end ring 52 which surrounds and is welded to the cylinder 12 in the same plane as the inner wall 18. The jacket 50 is provided with an annular flange 54 which is bolted or otherwise secured to the end ring 52.

The outer jacket 50 extends substantially beyond the orificed refractory end wall 24 of the combustion chamber and terminates in an end wall 56, which is welded or otherwise secured and sealed to the end of the jacket 50. The area of the orifice 26 is up to about one-half the area of the end wall to maximize back radiation without impeding gas flow. The industrial gases are directed into the annular space between the cylinder 12 of the combustion chamber and the jacket 50 through an inlet pipe section 58. As best seen in FIG. 4, the pipe section 58 has its axis off center from the axis of rotation of the cylinder 12 and jacket 50. In addition, a series of baffle plates 60, 62, and 64 are positioned inside the inlet pipe section 58 adjacent the opening into the annular space within the jacket 50 so as to direct the industrial gas in a flow direction which is tangential to the cylinder 12. Thus a rotary component of motion to the flow of industrial gas along the outside of the combustion chamber is provided.

As the industrial gases move longitudinally off the combustion chamber they enter the region between the end of the combustion chamber and the end wall 56 where they mix with the products of combustion from the combustion chamber which pass out through the flame exit orifice 26. This mixture is directed out through an outlet pipe 66. Because the gas from the combustion chamber enters the mixing region at a relatively high temperature, the outlet 66 and the jacket 50 are lined with a layer of refractory material 68 which also serves to radiate heat back to the combustion chamber. The refractory material extends back along the jacket 50 to a point where the temperature of the jacket is maintained at a safe level by the cooling effect of the industrial gases flowing in the annular space between the jacket and the cylindrical wall 12.

In operation, the addition of steam to the fuel gas has been found to provide substantially soot-free combustion. The presence of steam with the hydrocarbon gas has the effect of reducing any thermal reaction or cracking process in which free carbon is released from the hydrocarbon molecules. Even though some cracking of the hydrocarbon molecules may still take place in the combustion chamber, the intimate mixture of water molecules enhances the reaction of the released carbon with oxygen to form carbon monoxide and carbon dioxide. Typically, up to about 5 pounds of steam is mixed with each pound of fuel.

The combination of greater turbulance to provide improved mixing of the fuel gas and air, the high temperature within the combustion chamber, the radiating end wall 24 of refractory material for re-radiating energy into the combustion chamber, and the addition of steam to the fuel gas combine to insure more complete oxidation thereby removing all free oxygen from the reducing gas produced by the combustion operation. The combustion chamber preferably has a length to diameter ratio of about 2 to 1 to provide a volume equivalent to a gas residence time of 0.1 to 1 second. A residence time of about 0.5 second is preferred when the fuel gas containes 10% or more of propane and heavier hydrocarbon molecules. With fuel gases lean in propane or heavier components, very little steam need be premixed with the fuel gas. About one pound of steam for each pound of fuel is preferred. With fuel gases having heavier components or with liquid fuels, the ratio of steam may be increased to as much as five pounds of steam per pounds of fuel. If a liquid fuel is used, a steam atomizing spray nozzle is substituted for the burner ring for injecting the fuel into the combustion chamber.

While the combustion process has been described as generating a reducing gas, the same apparatus may be used where a neutral gas is required. This of course depends only on the amount of oxygen supplied in relation to the fuel gas.

What is claimed is:

1. Apparatus for generating hot gas free of molecular oxygen and soot by combustion of hydrocarbon fuel and mixing the hot gas with industrial gas, comprising:
   a. a cylindrical combustion chamber providing an internal refractory surface and having at one end an elongated inlet opening forming a throat axially aligned with an outlet opening in an opposing end wall of the chamber, which wall provides a refractory surface, each opening being of a smaller cross-sectional area than the axial cross-sectional area of the combustion chamber, the end containing the outlet opening forming a portion of a first radiating surface;
   b. a concentric cylindrical jacket enclosing the outlet end and having a second planar radiating end refractory surface facing the outlet opening of the combustion chamber, a portion of the jacket surrounding the cylindrical portion of the combustion chamber to form an annular passage therebetween, said concentric cylindrical jacket extending beyond the end of the combustion chamber having the outlet to form a mixing zone;
   c. a windbox for introduction of an oxygen-containing gas enclosing the inlet opening of the combustion chamber;
   d. means for directing the oxygen-containing gas into the windbox tangentially to the axis of the combustion chamber, whereby the gas has a rotating motion in passing through the throat;
   e. means at the throat for forming a plurality of jets of fuel and steam directed into the combustion chamber through the throat simultaneously with passage of the rotating motion oxygen-containing gas through the throat; and
   f. an inlet communicating with the annular passage for introduction of the industrial gas to the jacket and an outlet in the jacket adjacent the second radiating end surface for exhaust of the industrial gas and products of combustion from the combustion chamber.

2. Apparatus of claim 1 wherein said means directing the oxygen-containing gas into the windbox produces rotating velocities of 100 to 300 ft./sec. in the throat.

3. Apparatus of claim 2 wherein the throat at least doubles the rotating velocity in the windbox.

4. Apparatus of claim 1 wherein said means forming jets of fuel and steam includes an annular tube in the windbox extending around the inlet opening forming the throat of the combustion chamber, the tube having a plurality of openings through which fuel and steam pass into the throat.

5. Apparatus of claim 4 further including means connecting a premixed mixture of steam and fuel to the annular tube.

6. Apparatus of claim 1 wherein the inlet for the industrial gas extends tangentially to the cylindrical jacket whereby the industrial gas passes circumferentially around the annular passage between the combustion chamber and the jacket.

7. Apparatus of claim 1 wherein the outlet opening in the opposing end wall of the cylindrical combustion chamber has an area up to 50% of the cross-sectional area of the combustion chamber.

8. Apparatus for heating an industrial gas by mixing the industrial gas with a combustion gas free of molecular oxygen and soot, and formed by combustion of a hydrocarbon fuel for use in an industrial gas recovery process or the like, comprising:
   a. an elongated combustion chamber providing an internal refractory surface and having an inlet opening at one end forming an elongated throat and an outlet opening in a planar wall providing a portion of the internal refractory surface at the other end, the area of the openings being up to 50% of the axial cross-sectional area of the combustion chamber, means for directing a plurality of jets of fuel and steam into the inlet opening of the combustion chamber;
   b. means, rearward of the means for directing fuel and steam into the combustion chamber, for directing a stream of gas containing oxygen through the inlet opening, said last-named means generating a rotating component of motion to the stream of gas to provide a vortex in the combustion chamber;
   c. an annular chamber surrounding the combustion chamber to form an annular passage therebetween and enclosing the outlet end of the combustion chamber to form a mixing zone, said chamber providing a planar refractory surface facing the outlet opening of the combustion chamber;
   d. means directing the industrial gas into the annular chamber in a direction transverse to the longitudinal axis of the combustion chamber on one side of the annular chamber, and
   e. means for directing gases out of the annular chamber adjacent the outlet end of the combustion chamber.

9. Apparatus of claim 8 further including means for mixing steam with the fuel before steam and fuel are directed into the combustion chamber.

10. Apparatus for heating an industrial gas by mixing the industrial gas with a combustion gas free of molecular oxygen and formed by combustion of a hydrocarbon fuel for use in an industrial gas recovery process or the like, comprising:
   a. an elongated combustion chamber having a length to diameter ratio of 2 to 1 and providing an internal refractory surface and having an inlet opening at one end axially aligned with an outlet opening at the other end in a planar wall providing part of the refractory surface, the openings being smaller than the axial cross-sectional area of the combustion chamber, said inlet opening forming a constricted throat and said outlet opening formed by a first radiating end wall having an area up to 50% of the area of the end wall;
   b. annular means directing a hydrocarbon fuel in admixture with steam through a plurality of holes in the annular means into the combustion chamber;
   c. means for directing a stream of gas containing oxygen through the inlet opening, said last-named means generating a rotating component of motion to the stream of an oxygen containing gas to provide a vortex in the combustion chamber by passing the gas flow tangentially to the inner surface of the combustion chamber;
   d. an annular chamber surrounding the combustion chamber to form an annular passage therebetween and enclosing the outlet end of the combustion chamber, said annular chamber having a second planar radiating wall providing a refractory surface parallel to the first radiating end wall of the combustion chamber and spaced therefrom;
   e. inlet means for introducing industrial gas into the annular chamber, said inlet means associated with baffles to direct gas flow transverse to the longitudinal axis of the combustion chamber on one side of the chamber, and
   f. outlet means for directing gases out of the annular chamber adjacent the outlet end of the combustion chamber.

* * * * *